Oct. 30, 1934.  V. G. APPLE  1,978,663
ELECTRICAL AND MECHANICAL BRAKE CONTROL MECHANISM
Filed July 26, 1928
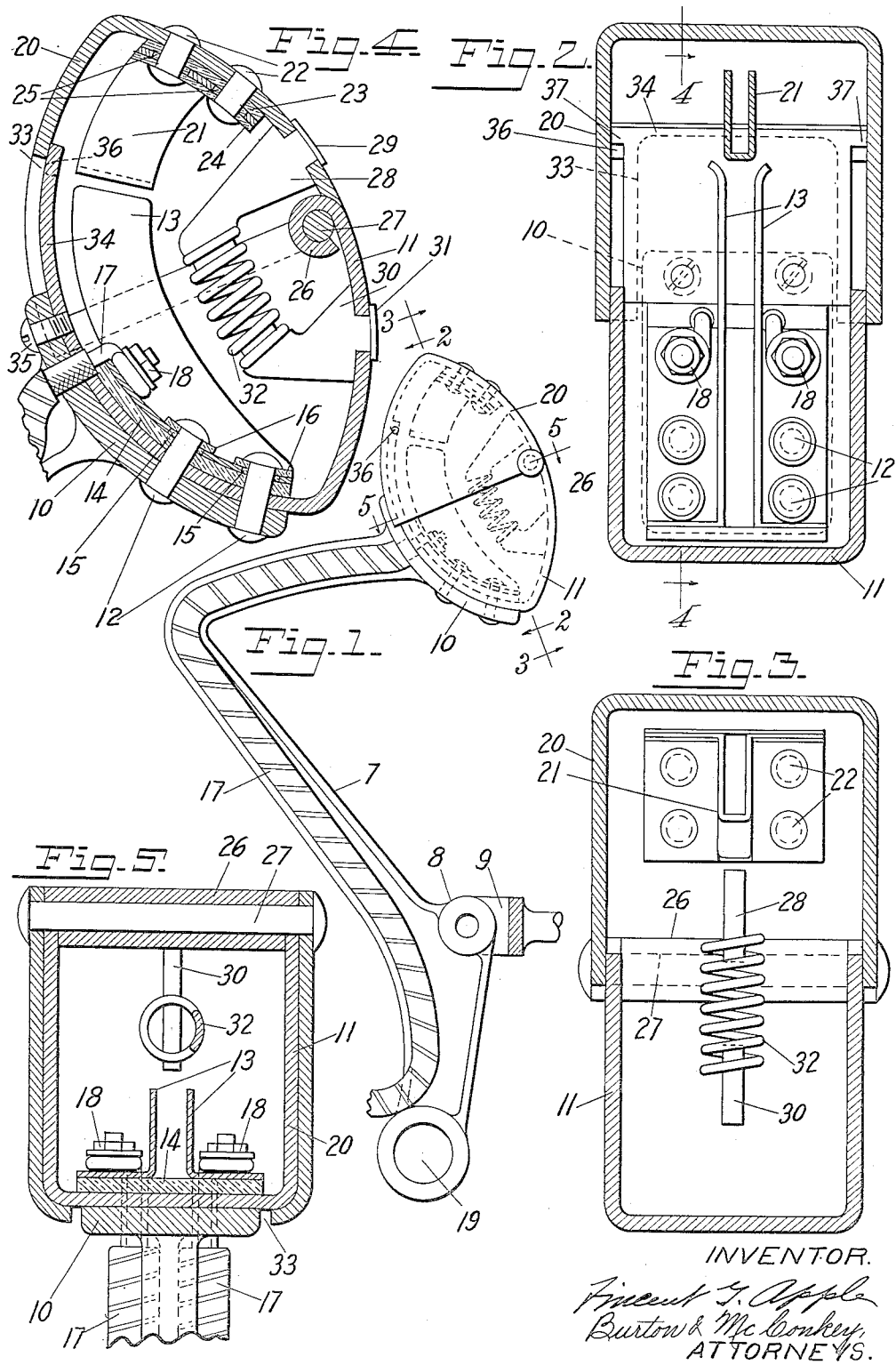
INVENTOR.
Vincent G. Apple
Burton & McConkey,
ATTORNEYS.

Patented Oct. 30, 1934

1,978,663

UNITED STATES PATENT OFFICE 1,978,663

ELECTRICAL AND MECHANICAL BRAKE CONTROL MECHANISM

Vincent G. Apple, Dayton, Ohio, assignor to Bendix Brake Company, South Bend, Ind., a corporation of Illinois Application July 26, 1928, Serial No. 295,581

11 Claims. (Cl. 200—59)

My invention relates to improvements in mechanism for controlling the operative elements of electro-mechanical brakes and particularly brakes applied to motor vehicles.

An object of my invention is the provision in brake mechanism of the character described, of a manually operable member, such as a brake pedal, adapted to be manually actuated to apply the brakes, and carrying an electric control switch readily operable during the manual application of the control member to control an electric power device adapted to exert brake applying pressure on the brakes.

Another object is to provide a control member so constructed that pressure may be applied to one portion thereof to manually actuate the member to exert brake applying force upon the brakes and pressure may be applied to a different portion thereof to operate a switch to bring an electric power device into action to exert applying force on the brakes.

An important feature resides in the employment of a brake pedal having a pressure pad provided with a rockably supported normally open switch member adapted to be rocked by depressible movement of the toe of the operator upon the pad to close the switch to throw an electric power device into action to exert pressure of application on the brakes.

The above objects and others, together with various meritorious features and advantages of my invention will more fully appear from the following description of the illustrative embodiment shown in the accompanying drawing and defined in the appended claims.

In the drawing:

Fig. 1 is a side elevation of a combined brake pedal and electric switch which embodies my improvements.

Fig. 2 is a cross-section through Fig. 1 at 2—2.

Fig. 3 is a cross-section through Fig. 1 at 3—3.

Fig. 4 is a cross-section through Fig. 2 at 4—4.

Fig. 5 is a cross-section through Fig. 1 at 5—5.

Referring to the drawing, the pedal stem 7 has the usual hub 8 to which mechanical brake operating linkage 9 may be secured, but instead of having the usual relatively flat tread for the foot to engage it has a curved pad 10 at its upper end to which the hollow casing containing the switch parts are secured.

A cup-shaped shell 11 drawn from sheet metal is secured to pad 10 by rivets 12, and two angular contact blades 13 are secured to the interior of the cup by the same said rivets. A strip of sheet insulation 14 separates the contact blades from the shell, and insulation washers 15 and 16 separate the contact blades and the rivets.

Two armored wires 17 are attached, one to each blade 13, by nuts 18. These wires are brought down alongside pedal stem 7 to near its pivotal point 19 before leaving the pedal, in order that flexure of the wires from pedal movement may be reduced to a minimum.

The cover 20 of the switch casing is also drawn from sheet metal, and is similar to shell 11 except that it is sufficiently larger to telescope over the shell on three sides, but not on the fourth side where it is hinged.

A contact member 21 is bent from a single piece of sheet metal and riveted to the upper inside of cover 20 by rivets 22. Strips 23 and 24 and washers 25 of insulation separate the contact blades from the rivets and from the cover. This contact member 21 is intended to enter between contact blades 13 to close the circuit through an electrically driven brake operating device.

A hinge is provided by curling one edge of shell 11 as at 26 and passing a pin 27 through this curled portion and through holes in the sides of cover 20.

A stamping 28 is riveted at 29 to cover 20 and a similar stamping 30 is riveted at 31 to shell 11. These stampings support spring 32 which is normally under compression tending to raise cover 20 from shell 11 and thus keep contact member 21 from between contact blades 13 to keep the circuit open.

In order that cover 20 may be depressed and telescoped over shell 11, it is cut away at 33 sufficiently to clear pad 10 when the cover is in its extreme downward position. A curved plate 34 of sufficient size to close the opening 33 is then secured to pad 10 by screws 35. Pins 36 in cover 20 engage ears 37 on curved plate 34 to limit the upward movement of cover 20 due to the expansion of spring 32.

From the foregoing it will be plain that the operator may transfer his manual brake applying effort from the lower portion to the upper portion of the switch casing, or vice versa, at will, by simply rocking his foot, whereby he may apply the brakes by manual effort alone, or by power and manual effort combined.

The manner in which the mechanism herein shown and described is combined with electro-magnetic brake operating means and with suitable linkage to compose a braking system, appears in my co-pending application Serial No. 295,578, filed July 26, 1928, and a suitable electric power device for use therewith is illustrated and claimed in my co-pending application Serial No. 295,580, filed July 26, 1928, but since this mechanism is combinable with various forms of electric power devices, and various forms of linkage, and therefore has in itself a diversified utility, it is made the subject of this separate application wherein

I claim:

1. In brake mechanism, a pivotally supported brake pedal having a completely closed hollow pressure pad head at one end, said head consisting of a lower shell rigid with the pedal and adapted to receive manual pressure and an upper shell rockably connected with the first shell and adapted to receive manual pressure, normally open electric switch mechanism positioned within and between said shells and adapted to be closed upon a determined pressure applied to the movable shell to rock it with respect to the rigid shell.

2. In brake mechanism, a pivotally supported brake pedal having at one end a hollow outwardly convex manual pressure pad casing comprising two hollow pressure receiving telescopic sections, each section having a manual pressure receiving face, one section being rigid with the pedal to transmit manual pressure directly thereto, the other section being pivoted to the first section to partially telescope thereover, electric switch mechanism positioned within the casing including cooperating contact elements carried by each section adapted to be brought into contact to close the switch upon the telescoping of said sections and a spring normally holding said sections apart separating said contact elements.

3. Brake pedal structure comprising a depressible pedal stem having a composite tread plate, one component of which is secured to the end of said stem and extends therebelow, the other component of which is pivoted to said first component at a point in substantial alignment with said stem and extends above said stem, and means whereby relative movement of said upper component closes an electric circuit, said means being adapted to maintain a closed circuit throughout a substantial portion of the permissible pivotal movement between said components.

4. Mechanism of the class described including a brake pedal stem having a convex seat portion at the upper extremity thereof, a substantially cup-shaped member having one curved surface secured to the upper portion of said seat, and a second cup-shaped member constituting a telescoping closure for the upper portion of said first mentioned cup-shaped member pivoted to the upper outer edge portion thereof.

5. In combination with mechanism of the class described, a treadle member comprising a hollow cup-shaped member and a telescoping closure member pivoted thereto adjacent to the upper edge of said cup-shaped member, the pivot point being in substantial alinement with the stem of said treadle.

6. In combination with mechanism of the class described, a treadle member comprising a hollow cup-shaped member, a telescoping closure member pivoted thereto adjacent to the upper edge of said said cup-shaped member, a pair of arcuate contact plates secured to the inside of said first mentioned cup-shaped member, and a cooperating arcuate contact plate secured to the inner portion of said closure member in operative relation to said first mentioned pair of plates.

7. In mechanism of the class described, the combination of a brake pedal stem having a seat portion positioned on its upper extremity, a hollow cup-shaped unit fixedly positioned thereon, a cooperating cup-shaped closure member pivoted to the side of said first mentioned cup-shaped member in substantial alinement with said pedal stem, and cooperating switch plates positioned on the interior of each of said members.

8. In mechanism of the class described, the combination of a hollow brake pedal stem having a seat portion positioned on its upper extremity, a hollow cup-shaped unit fixedly positioned thereon, a cooperating cup-shaped closure member pivoted to the side of said first mentioned cup-shaped member in substantial alinement with said pedal stem, cooperating arcuate switch plates positioned on the interior of each of said members, and electric cables extending through said stem and secured to one set of switch plates.

9. In mechanism of the class described, the combination of a brake pedal stem having a seat portion positioned on its upper extremity, a hollow cup-shaped unit fixedly positioned thereon, a cooperating cup-shaped closure member pivoted to the side of said first mentioned cup-shaped member in substantial alinement with said pedal stem, cooperating switch plates positioned on the interior of each of said members, and yieldable means associated with each of said members operable to retain the same in extended position.

10. Mechanism of the class described including, in combination a hollow cup-shaped member, a cooperating cup-shaped closure member pivotally positioned adjacent the upper edge of said first mentioned member whereby a telescoping action of the two is secured, arms extending inwardly in substantial parallel relation on opposite sides of said pivot point from said cup-shaped member and said closure member respectively, and a yielding member interposed between said arms operable to retain said closure in extended position.

11. A pedal structure comprising a depressible pedal stem, a composite tread plate secured to said stem and provided with a pressure receiving portion of a general convex shape, said composite tread plate having one component part thereof rigidly mounted with respect to said stem and a second component part pivotally mounted with respect to the first component part, said second component part having an arcuate tread portion normally conforming with the general convex shape of said pressure receiving portion but adapted upon pressure being exerted thereon to be rocked about its pivotal mounting out of conformity with the general convexity of the pressure receiving portion.

VINCENT G. APPLE.